(12) United States Patent
Schmitt et al.

(10) Patent No.: US 12,552,458 B2
(45) Date of Patent: Feb. 17, 2026

(54) MOTOR VEHICLE

(71) Applicant: Dr. Ing. h.c. F. Porsche Aktiengesellschaft, Stuttgart (DE)

(72) Inventors: Hans-Jürgen Schmitt, Muehlacker (DE); Mirko Floreck, Eberdingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 384 days.

(21) Appl. No.: 18/242,635

(22) Filed: Sep. 6, 2023

(65) Prior Publication Data
US 2024/0116574 A1   Apr. 11, 2024

(30) Foreign Application Priority Data
Oct. 6, 2022   (DE) ...................... 10 2022 125 758.4

(51) Int. Cl.
| | | |
|---|---|---|
| *B62D 21/15* | (2006.01) | |
| *B62D 25/04* | (2006.01) | |
| *B62D 25/08* | (2006.01) | |
| *B62D 25/20* | (2006.01) | |
| *B62D 27/04* | (2006.01) | |

(52) U.S. Cl.
CPC ........... *B62D 21/157* (2013.01); *B62D 25/04* (2013.01); *B62D 25/08* (2013.01); *B62D 25/082* (2013.01); *B62D 25/2045* (2013.01); *B62D 27/04* (2013.01)

(58) Field of Classification Search
CPC ....... B62D 21/157; B62D 27/00; B62D 27/04
USPC ........... 296/187.12, 187.02, 187.03, 187.11, 296/193.02, 193.08, 23.01, 203.03, 296/203.04, 203.29, 203.3
See application file for complete search history.

(56) References Cited

U.S. PATENT DOCUMENTS

| | | | | |
|---|---|---|---|---|
| 7,422,271 B2 * | 9/2008 | Wolkersdorfer | ....... | B62D 25/04 296/193.02 |
| 7,614,683 B2 * | 11/2009 | Roccato | ............... | B62D 21/157 296/187.03 |
| 9,302,641 B2 * | 4/2016 | Hirata | ..................... | B60R 21/13 |
| 2007/0284914 A1 | 12/2007 | Schiebel et al. | | |
| 2010/0078925 A1 * | 4/2010 | Froschle | ................. | B60R 21/13 280/756 |
| 2022/0063391 A1 | 3/2022 | Kim et al. | | |
| 2022/0242344 A1 | 8/2022 | Kellner et al. | | |

FOREIGN PATENT DOCUMENTS

| | | |
|---|---|---|
| DE | 102006014981 A1 | 10/2007 |
| DE | 102010006672 A1 | 8/2011 |
| DE | 102010036671 A1 | 2/2012 |
| DE | 102010039109 A1 | 2/2012 |

(Continued)

*Primary Examiner* — Dennis H Pedder
(74) *Attorney, Agent, or Firm* — Buchanan Ingersoll & Rooney PC

(57) ABSTRACT

A motor vehicle having a bearing structure, which includes a shell having a crossbeam, which is integrated into the bearing structure with its opposite ends between two B-pillars. A respective side impact support is combined with a crash pad between the opposite ends of the crossbeam and the B-pillars, which side impact support constitutes a second load path emanating from the affected B-pillar in case of a side impact, which is provided in addition to a first load path, which extends from the B-pillar into the crossbeam via the respective side impact support in case of a side impact.

9 Claims, 5 Drawing Sheets

(56) References Cited

FOREIGN PATENT DOCUMENTS

| | | |
|---|---|---|
| DE | 102015207696 A1 | 10/2016 |
| DE | 102015215655 A1 | 2/2017 |
| DE | 102018212817 A1 | 2/2020 |
| DE | 102021102198 B3 | 2/2022 |
| EP | 1762465 A1 | 3/2007 |
| EP | 3747736 A1 | 12/2020 |
| WO | 2021/003299 A1 | 1/2021 |

\* cited by examiner

MOTOR VEHICLE

CROSS-REFERENCE TO RELATED APPLICATION

This application claims priority to German Patent Application No. 10 2022 125 758.4, filed Oct. 6, 2022, the content of such application being incorporated by reference herein in its entirety.

FIELD OF THE INVENTION

The invention relates to a motor vehicle having a bearing structure, which comprises a shell having a crossbeam, which is integrated into the bearing structure with its opposite ends between two B-pillars.

BACKGROUND OF THE INVENTION

The European application EP 1 762 465 A1, which is incorporated by reference herein, discloses an impact protection structure for providing an impact energy absorption with multiple crash pads made of a plastic foam. The American application US 2022/0063391 A1, which is incorporated by reference herein, discloses a battery of an electric vehicle, which is equipped with crash pads made of a plastic foam for absorbing stresses in case of a side crash of the electric vehicle. The international application WO 2021/003299 A1, which is incorporated by reference herein, discloses an electric vehicle having an underbody battery arranged within a frame, wherein in each case a plastic deformation element is arranged between a side element of the frame and the underbody battery. The European application EP 3 747 736 A1, which is incorporated by reference herein, discloses an electric vehicle having a battery on which plastic side deformation elements are arranged for the event of a side crash. The German application DE 10 2010 036 671 A1, which is incorporated by reference herein, discloses a convertible vehicle having a bearing structure, which comprises a stiffening structure in the rear region behind vehicle seat rests, which is equipped with at least one deformation element for defined deformation in the event of a rear impact.

SUMMARY OF THE INVENTION

Described herein is a motor vehicle having a bearing structure, which comprises a shell having a cross-beam, which is integrated into the bearing structure with its opposite ends between two B-pillars in view of high specifications to be met in case of a side impact.

The motor vehicle has a bearing structure, which comprises a shell having a crossbeam, which is integrated into the bearing structure with its opposite ends between two B-pillars, in that in each case a side impact support is combined with a crash pad between the opposite ends of the crossbeam and the B-pillars, which side impact support constitutes a second load path emanating from the affected B-pillar in case of a side impact, which is provided in addition to a first load path, which extends from the B-pillar into the crossbeam via the respective side impact support in case of a side impact. The motor vehicle is a convertible vehicle or a coupe. In the case of a motor vehicle configured as a convertible, the crossbeam serves for the purpose of an anti-rollover function. The first and second load paths both extend inwardly from the B-pillar affected by the side impact. The first load path passes through the side impact support into the crossbeam. The second load path extends through the crash pad. Via the crash pad, the crash load that occurs in a side impact can be highly effectively distributed in the bearing structure with the crossbeam. The B-pillar is supported on the crossbeam via the side impact support and the crash pad. In addition, the B-pillar is preferably supported below the crossbeam on the shell structure of the motor vehicle via the crash pad. The claimed bearing structure with the crash pad makes it particularly advantageous to use like parts in the shells of different vehicle variants. The different vehicle variants are, in particular, a coupe and a convertible. For example, the crash pad advantageously serves to fill in a receiving space for a convertible top bearing and a convertible top drive in a motor vehicle without a top, for example in a coupe, such that the crash pad can realize substantially the same or similar block-forming effect as with the top bearing and the top drive in a motor vehicle implemented as a convertible.

A preferred embodiment example of the motor vehicle is characterized in that the crash pad is made from a foam material. Advantageously, a foam is used which is also used in conventional crash pads. The foam is preferably an expanded foam made of a thermoplastic material such as polypropylene. Such a foam is also referred to with the abbreviation EPP.

A further preferred embodiment example of the motor vehicle is characterized in that the side impact support is fastened to the respectively associated B-pillar with a first end, wherein the side impact support is fastened to the crossbeam with a second end, wherein the second end is arranged rearwardly in a longitudinal direction of the vehicle and inwardly offset from the first end of the side impact support in a transverse direction of the vehicle. The longitudinal direction of the vehicle is also referred to as the x direction. Similarly, the transverse direction of the vehicle is also referred to as the y direction. A vertical direction of the vehicle is also referred to as a z direction. By combining the side impact supports with the crash pads, the side support of the B-pillars on the shell of the motor vehicle is effectively improved.

A preferred embodiment example of the motor vehicle is characterized in that the crash pad fills a cavity bounded on an outside of the B-pillar in the transverse direction of the vehicle and on an inside of a transverse bearing structure in the transverse direction of the vehicle, which extends below the crossbeam in a vertical direction of the vehicle. The cavity is not limited to, or is only a part of, the side impact support. The side impact support is arranged, at least partially, above the crash pad. The lateral impact support is used in order to stably integrate the crossbeam, which provides an anti-rollover function on a motor vehicle configured as a convertible, into the support structure of the motor vehicle. The first load path passes through the side impact support. The crash pad advantageously serves to realize the second load path. Advantageously, in the event of a side impact, a portion of a crash load can be introduced into the transverse bearing structure of the motor vehicle below the crossbeam via the second load path.

A preferred embodiment example of the motor vehicle is characterized in that the crash pad is supported on at least one oblique support surface on the transverse bearing structure. The support surface is advantageously arranged obliquely such that a portion of the crash load that occurs in a side impact is introduced obliquely downward into the transverse bearing structure.

A preferred embodiment example of the motor vehicle is characterized in that the crash pad is supported on the transverse bearing structure with two oblique support surfaces connected by a step. This optimizes the introduction of force via the second load path into the transverse bearing structure below the crossbeam. The step advantageously serves to prevent an undesirable slippage of the crash pad under stress.

A preferred embodiment example of the motor vehicle is characterized in that the crash pad comprises a positive-locking geometry facing the B-pillar, which geometry engages with a complementary positive-locking recess in the B-pillar. Thus, the crash pad can be held in position in the longitudinal direction of the vehicle, even under stress.

A preferred embodiment example of the motor vehicle is characterized in that the side impact support is configured as a hollow chamber profile designed to resemble a quarter circle arc. This results in a stable and comfortable connection of the crossbeam to the bearing structure of the motor vehicle above the transverse bearing structure.

A preferred embodiment example of the motor vehicle is characterized in that the shell is configured as a box shell. The shell is configured as a box shell, or in a similar way as the motor vehicle body disclosed in German application DE 10 2021 102 198 B3, which is incorporated by reference herein.

The invention further relates to a crash pad, a side impact support, a crossbeam, and/or a transverse bearing structure for an aforementioned motor vehicle. The aforementioned parts can be handled separately.

The invention optionally also relates to a method for absorbing side impact energy in a motor vehicle as described above. On the one hand, a stable connection of the crossbeam is ensured via the side impact support in combination with the crash pad. Thus, the crossbeam can advantageously also represent an anti-rollover function of the motor vehicle. Moreover, in the event of a side impact, side impact energy can be highly effectively absorbed via the side impact support in combination with the crash pad.

BRIEF DESCRIPTION OF THE DRAWINGS

Further advantages, features, and details of the invention arise from the following description, in which various embodiment examples of the invention are described in detail with reference to the drawing.

DETAILED DESCRIPTION OF THE INVENTION

Figure 1:
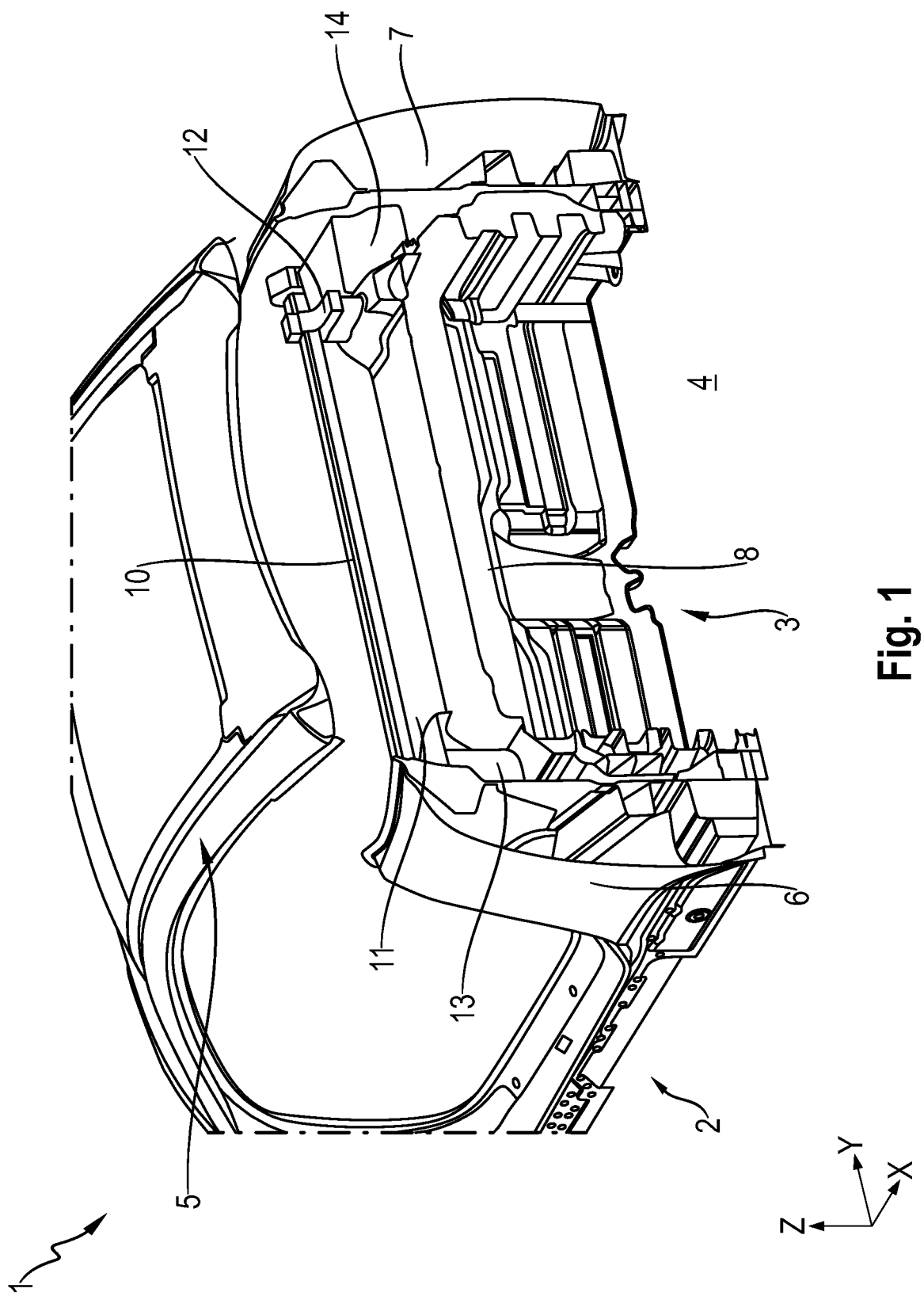
FIG. 1 depicts a perspective bearing structure of a motor vehicle, shown truncated in a rear region.

In FIG. 1, a bearing structure 2 of a motor vehicle 1 is shown in perspective and in a rear region of the motor vehicle 1. The bearing structure 2 is a shell 3, which is designed as a box shell. In the rear region, which is shown truncated, the box shell 3 bounds a receiving space 4 for a propulsion device and/or a high-voltage battery, if the propulsion device is an electric propulsion device.

The motor vehicle 1 is a coupe with a driver seat, a passenger seat, and a roof 5. Two B-pillars 6, 7 of the bearing structure 2 are designed to be shorter and do not extend to the roof 5 of the motor vehicle 1. The receiving space 4 is bounded on the bottom by a transverse bearing structure 8.

For example, the transverse bearing structure 8 comprises a partition wall that delimits the receiving space 4 from a vehicle interior. In a vertical direction of the vehicle, also referred to as the z direction, a crossbeam 10 is arranged between the transverse bearing structure 8 and the roof 5 of the motor vehicle 1. The crossbeam 10 serves, for example, in the case of a motor vehicle 1 configured as a convertible, for the purpose of an anti-rollover function.

The crossbeam 10 can be combined with a rollover bracket. The crossbeam 10 can also be configured as a rollover bracket. The crossbeam 10 is fastened to the B-pillars 6, 7 of the bearing structure 2 by means of two side impact supports 11, 12. The side impact supports 11, 12 are each combined with a crash pad 13, 14. The two crash pads 13, 14 are formed from an EPP foam.

Figure 2:
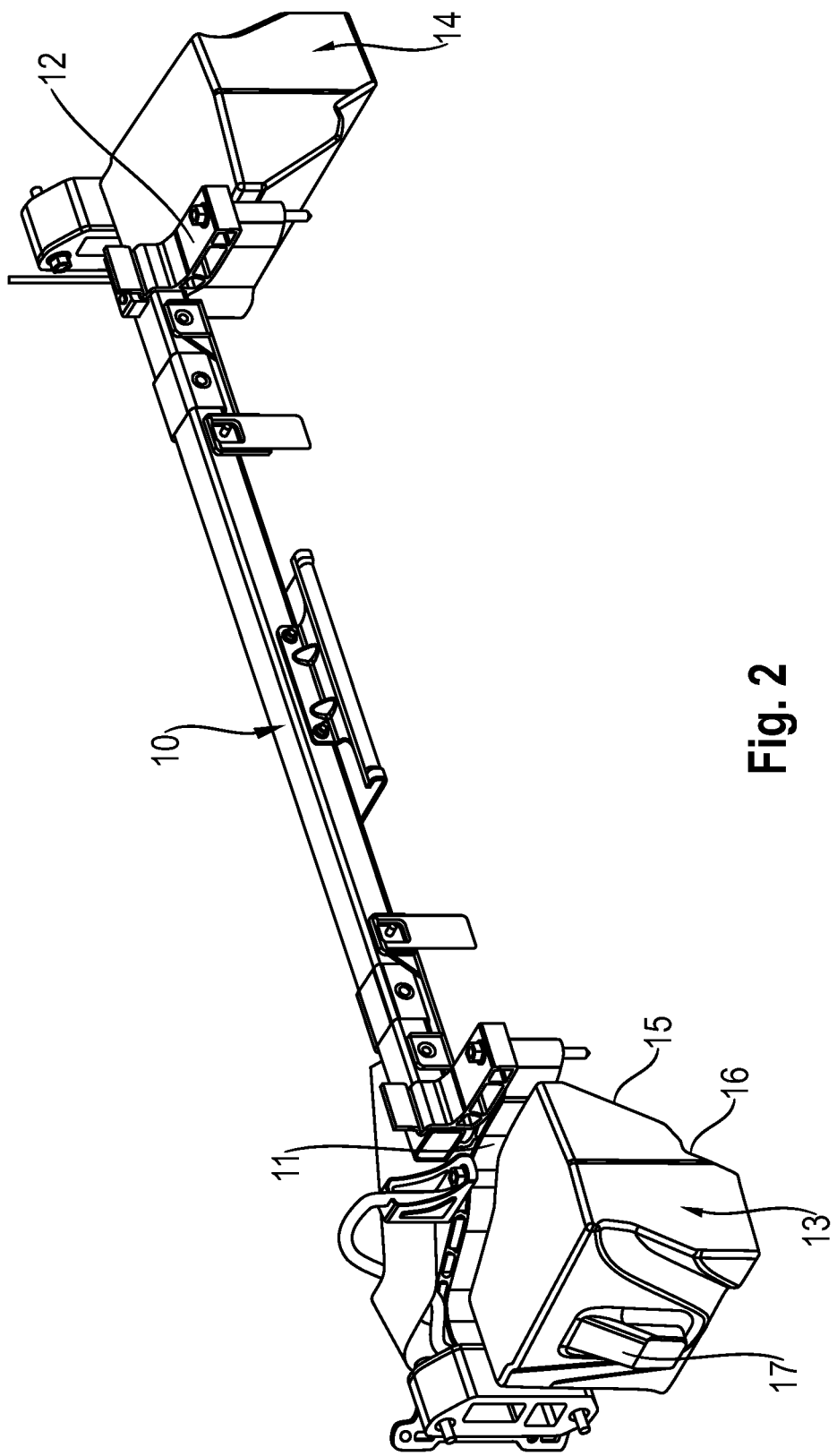
FIG. 2 depicts a crossbeam of the bearing structure of the motor vehicle from FIG. 1 between two side impact supports, each combined with a crash pad.

In FIG. 2, the crossbeam 10 and the side impact supports 11, 12 combined with the crash pads 13, 14 are shown alone in a perspective view. The side impact supports 11, 12 serve as first load paths in case of a side impact. The crash pads 13, 14 serve as second load paths in case of a side impact.

As seen in FIG. 2, the crash pad 13 comprises two vertical or oblique support surfaces 15, 16. A step is formed between the two support surfaces 15, 16. With the two support surfaces 15, 16, the crash pad 13 is supported on the transverse bearing structure 8 in its installed state as shown in FIG. 1.

In addition, FIG. 2 shows that the crash pad 13 has a positive-locking geometry 17 on an outwardly facing side surface. In the installed state, the crash pad 13 engages with its positive-locking geometry 17 into a complementary positive-locking recess, which is provided on the inside of the B-pillar 6, as can be seen in FIG. 1. The positive-locking geometry 17 of the crash pad 13 engaging with the positive-locking recess serves to hold or fix the crash pad 13 in the installed state in a longitudinal direction of the vehicle, which is also referred to as the x direction.

Figure 4:
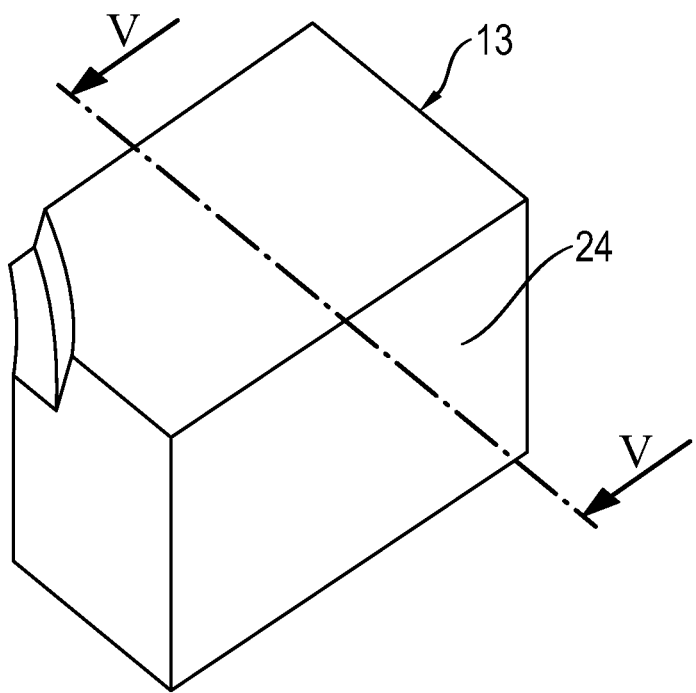
FIG. 4 depicts a perspective view of the crash pad from FIG. 3 by itself.
Figure 5:
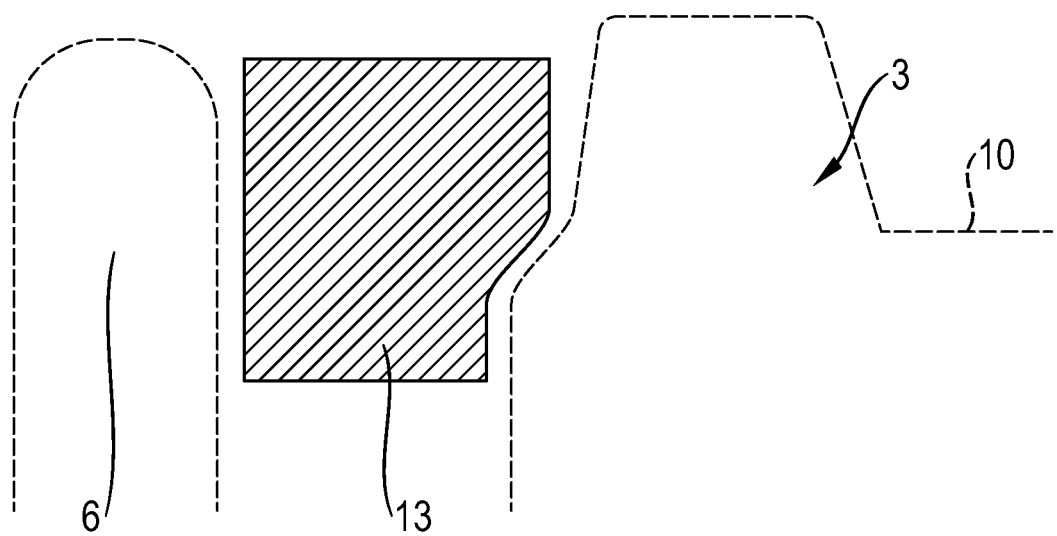
FIG. 5 depicts a section along line V-V with a bearing structure indicated by a dashed line.
Figure 6:
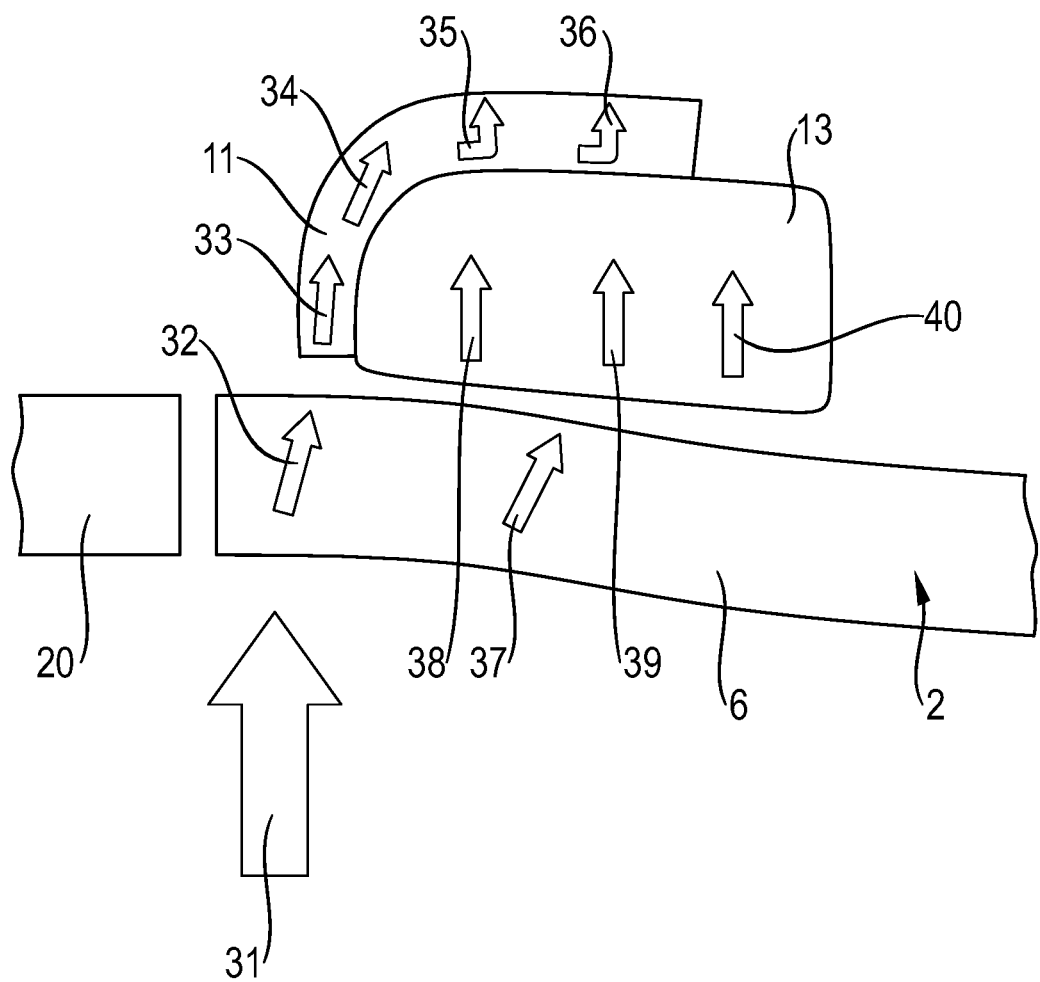
FIG. 6 depicts a section from FIG. 3 in a top plan view with arrows for illustrating two load paths in case of a side impact.

FIGS. 3 to 6 illustrate how two load paths, indicated by arrows 32 to 36 and 37 to 40 in FIG. 6, can be realized with the side impact support 11 and the crash pad 13 in the event of a side crash or side impact on the B-pillar 6. In FIG. 6, a crash load is indicated by an arrow 31.

Figure 3:
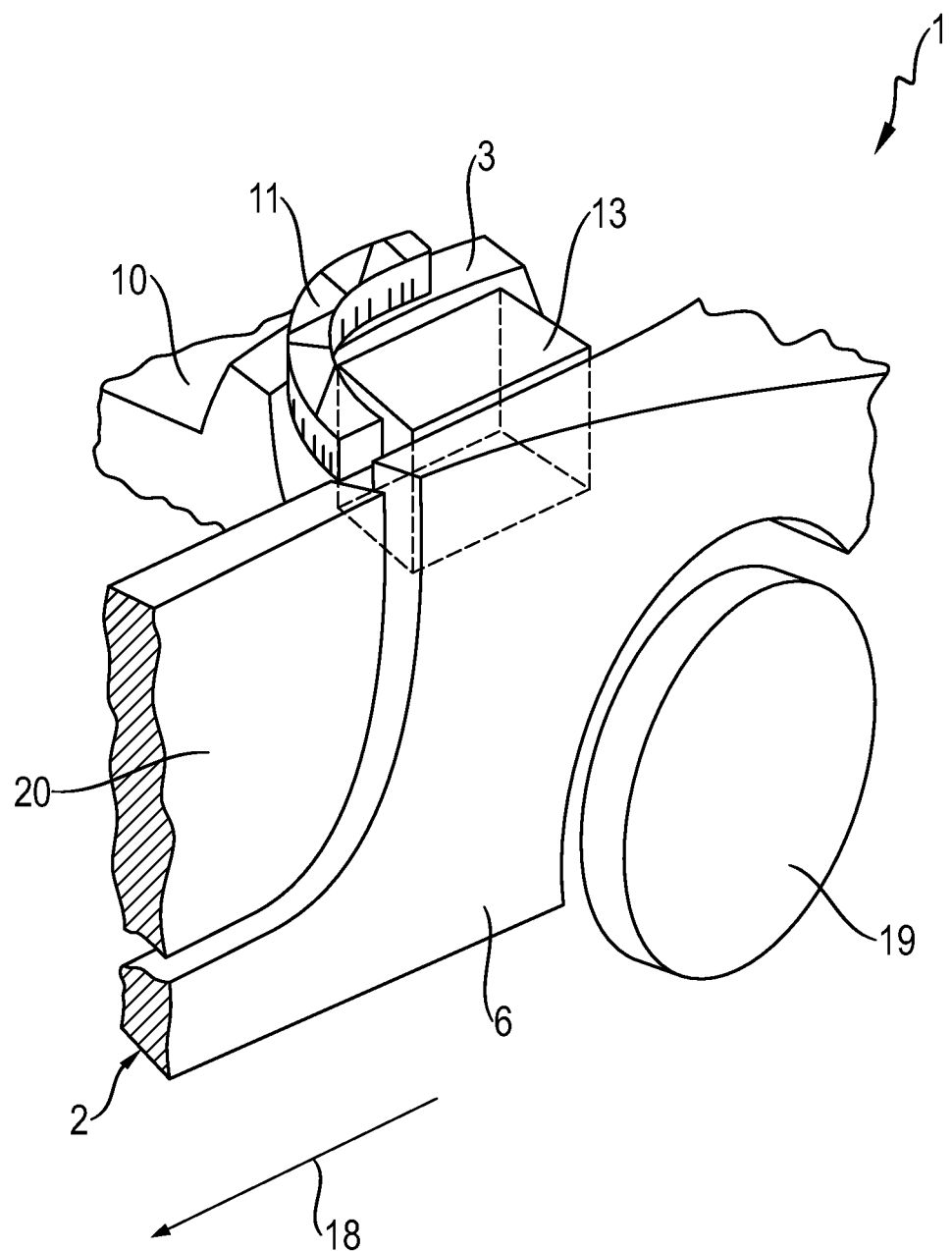
FIG. 3 depicts a schematic illustration of an excerpt of a motor vehicle having a B-pillar to which a side impact support is fastened, which is combined with a crash pad.

In FIG. 3, an arrow 18 indicates a forward direction of travel of the motor vehicle 1 shown in FIG. 3, only partially in perspective. The bearing structure 2 of the motor vehicle 1 comprises the B-pillar 6 between a rear wheel 19 and a door 20. The shell 3 of the motor vehicle 1, which is designed as a box shell, comprises the crossbeam 10, which, in an embodiment of the motor vehicle 1 as a convertible, serves as an anti-rollover function. The crossbeam 10 is fixedly connected to the B-pillar 6 by means of the side impact support 11.

The side impact support 11 is configured as a multi-chamber profile and has substantially the design of a quarter circle arc that is screwed at one end to the B-pillar 6. At the other end, the side impact support 11 is screwed to the crossbeam 10. The crash pad 13 is arranged in a cavity between the crossbeam 10 and the B-pillar 6.

The installation space of the crash pad 13 is bounded laterally outwardly by the B-pillar 6, as can be seen from a combined view of FIGS. 4 and 5. Laterally inwardly, the cavity in which the crash pad 13 is received is bounded by the shell 3. The crash pad 13 is made from a foam material 24. The foam 24 is an EPP foam.

In FIG. 6, the arrows 31 to 40 indicate how the crash load 31 is distributed over the two load paths 32 to 36 and 37 to 40. A first load path 32-36 passes through the side impact support 11. From there, the load fraction of this load path is then passed into the crossbeam, not shown in FIG. 6.

A second load path 37 to 40 passes through the crash pad 13. The load is passed into the transverse bearing structure 8, not shown in FIG. 6, via the crash pad 13. A desired energy absorption in the case of a side impact is advantageously achieved by deformation of the side impact support 11 and the crash pad 13.

REFERENCE NUMBERS

1 Motor vehicle
2 Bearing structure
3 Box shell
4 Receiving space
5 Roof
6 B-pillar
7 B-pillar
8 Transverse bearing structure
10 Crossbeam
11 Side impact support
12 Side impact support
13 Crash pad
14 Crash pad
15 Support surface
16 Support surface
17 Positive locking geometry
18 Arrow
19 Rear wheel
20 Door
24 Foam
31 Crash load
32 First load path
33 First load path
34 First load path
35 First load path
36 First load path
37 Second load path
38 Second load path
39 Second load path
40 Second load path

What is claimed is:

1. A motor vehicle comprising:
a bearing structure,
a shell having a crossbeam located between two B-pillars, the crossbeam being integrated into the bearing structure,
a side impact support combined with a crash pad located between one end of the crossbeam and one of the B-pillars,
wherein, in case of a side impact, the side impact support constitutes (i) a first load path extending from said one of the B-pillars into the crossbeam, and (ii) a second load path emanating from said one of the B-pillars.

2. The motor vehicle according to claim 1, wherein the crash pad is comprised of foam material.

3. The motor vehicle according to claim 1, wherein a first end of the side impact support is fastened to said one of the B-pillars, wherein a second end of the side impact support is fastened to the crossbeam, wherein the second end is arranged rearwardly in a longitudinal direction of the vehicle and inwardly offset from the first end of the side impact support in a transverse direction of the vehicle.

4. The motor vehicle according to claim 1, wherein the crash pad fills a cavity bounded on an outside of said one of the B-pillars in a transverse direction of the vehicle and on an inside of a transverse bearing structure in the transverse direction of the vehicle, which extends below the crossbeam in a vertical direction of the vehicle.

5. The motor vehicle according to claim 4, wherein the crash pad is supported on at least one oblique support surface of the transverse bearing structure.

6. The motor vehicle according to claim 4, wherein the crash pad is supported on two oblique support surfaces connected by a step on the transverse bearing structure.

7. The motor vehicle according to claim 1, wherein the crash pad comprises a positive-locking geometry facing said one of the B-pillars, which geometry engages with a complementary positive-locking recess in said one of the B-pillars.

8. The motor vehicle according to claim 1, wherein the side impact support is a hollow chamber profile in the form of a quarter circle arc.

9. The motor vehicle according to claim 1, wherein the shell is a box shell.

* * * * *